United States Patent [19]

Takagi et al.

[11] 4,196,658
[45] Apr. 8, 1980

[54] COFFEE-POT AND COFFEE-MILL COMBINATION

[75] Inventors: Shoji Takagi, Toyoake; Yoshiyuki Miwa, Nishikasugai, both of Japan

[73] Assignee: Tokyo Shibaura Denki Kabushiki Kaisha, Kawasaki, Japan

[21] Appl. No.: 963,139

[22] Filed: Nov. 22, 1978

[30] Foreign Application Priority Data

| Nov. 30, 1977 | [JP] | Japan | 52-144106 |
| Nov. 30, 1977 | [JP] | Japan | 52-161718[U] |
| Dec. 27, 1977 | [JP] | Japan | 52-178742[U] |
| Dec. 27, 1977 | [JP] | Japan | 52-178743[U] |
| Dec. 30, 1977 | [JP] | Japan | 52-178087[U] |
| Dec. 30, 1977 | [JP] | Japan | 52-178089[U] |
| Apr. 26, 1978 | [JP] | Japan | 53-55533[U] |
| May 29, 1978 | [JP] | Japan | 53-73202[U] |

[51] Int. Cl.$^2$ .................................................. A47J 31/42
[52] U.S. Cl. ................................................... 99/286
[58] Field of Search ............ 99/286, 287, 288, 289 R, 99/295, 290, 298, 300, 304, 305

[56] References Cited

U.S. PATENT DOCUMENTS

| 2,517,073 | 8/1950 | Alvarez | 99/286 |
| 3,107,600 | 10/1963 | Buisson | 99/286 |
| 3,247,778 | 4/1966 | Davis | 99/286 |
| 3,327,615 | 6/1967 | Swan | 99/286 |
| 3,871,273 | 3/1975 | Hsieh | 99/286 |
| 3,967,546 | 7/1976 | Cailliot | 99/286 |
| 4,074,621 | 2/1978 | Cailliot | 99/286 |

FOREIGN PATENT DOCUMENTS

| 1532404 | 6/1968 | France . |
| 53-9427977 | 10/1978 | Japan . |
| 1373710 | 11/1974 | United Kingdom . |
| 1468196 | 3/1977 | United Kingdom . |

Primary Examiner—Robert W. Jenkins
Attorney, Agent, or Firm—Cushman, Darby & Cushman

[57] ABSTRACT

In a coffee-pot and coffee-mill combination, a cup accommodating section is provided in adjacent to an electric motor for driving grinder adapted to grind coffee-beans, and a case accommodating section and a water storing tank are provided above the motor and the cup accommodating section, respectively. The grinder and a filter are provided in the case. The water in the water storing tank is heated by a heating section, and the hot water is supplied into the case to extract a coffee liquid.

13 Claims, 21 Drawing Figures

COFFEE-POT AND COFFEE-MILL COMBINATION

This invention relates a coffee-pot and coffee-mill combination (hereinafter referred to merely as "a combination" when applicable) which comprises a case having a grinder for grinding coffee-beans into coffee powder, a filter for receiving the coffee powder thereon, and a hot water supplying device for supplying hot water into the case.

Heretofore, in the case where a coffee liquid is prepared in homes, in general, coffee powder obtained by grinding coffee-beans to a grain size suitable for a drip type, siphon type or pot type of coffee liquid extractor is purchased and stored as much as suitable for the use in, for instance, about one month and a necessary amount of coffee powder is put in the coffee liquid extractor to extract a coffee liquid therefrom.

However, this is disadvantageous in that the scent of coffee-beans is lost and accordingly the flavor is degraded during the storage of the coffee-beans.

Therefore, persons well versed in the coffee preparation employ the following method: That is, whenever they want a coffee liquid, they grind coffee-beans with their coffee-bean grinder to a desired grain size, and the coffee powder is put in the coffee-liquid extractor. However, this method is still disadvantageous in that it is necessary to provide two devices, namely, the coffee-bean grinder and the coffee-liquid extractor, which will occupy a relatively large area. In addition, the operations of these two devices are rather troublesome because they must be operated individually, and furthermore the cleaning of them is not simple because they must be cleaned separately. Furthermore, as it is necessary to replace the coffee powder from the coffee-bean grinder into the coffee liquid extractor, the coffee powder may be scattered or the scent of coffee-beans may be lost during the replacement. Thus, the method still has problems to be solved in view of the operation and of maintaining the scent of coffee-beans unchanged.

In view of the foregoing, a first object of this invention is to provide a coffee-pot and coffee-mill combination in which all the process from grinding coffee-beans to extracting a coffee liquid can be achieved by only one combination, the operation and cleaning can be readily accomplished, a coffee liquid can be prepared without losing the scent of coffee-beans, and in which as the case is placed above the driving electric motor, the rotation of the motor can be effectively transmitted to the grinder in the case without using a pully transmission mechanism, whereby the size of the entire combination can be reduced.

A second object of the invention is to provide a coffee-pot and coffee-mill combination in which all the process from grinding coffee-beans to extracting a coffee liquid is carried out, the operation and cleaning can be achieved readily, and a coffee liquid can be prepared without losing the scent of coffee-beans, and in which the coffee-beans are guided downwardly by the lower surface of a diffusing element so as to be effectively and smooth ground, hot water supplied into the case through a hot water pouring outlet of a cover member placed on the case is guided by the upper surface of the diffusing element towards the inner wall of the case, whereby the hot water is effectively supplied onto the coffee powder which has been collected along the inner wall by the rotation of the grinder, so that a coffee-liquid is effective extracted.

A third object of the invention is to provide a coffee-pot and coffee-mill combination in which, when the combination is displaced after the use or for cleaning after the use, dripping the coffee-liquid or hot water maintained stuck on the inner surface of the case is positively prevented.

A fourth object of the invention is to provide a coffee-pot and coffee-mill combination in which the filter is clamped by an upper case and a lower case forming the case assembly whereby the filter is positively secured to the case assembly, that is, the filter is never removed from the case assembly during the use of the combination, and in which as the case assembly can be detachably mounted on the body of the combination and can be divided into two parts, namely the upper case and the lower case, the case assembly and the filter can be readily cleaned, and as the connection portions of these two parts can be completely sealed with a packing which is used also as a handle, and accordingly it is unnecessary to additionally provide a particular handle.

A fifth object of the invention is to provide a coffee-pot and coffee-mill combination in which the filter is protected from being bent or creased or deformed, whereby coffee-beans can be effectively ground.

A sixth object of the invention is to provide a coffee-pot and coffee-mill combination in which, even if the case without its cover is placed in the body of the combination, insertion of fingers or the like into the case is prevented, and accordingly the user's finger or the like is never be injured by the rotating grinder, which leads to an improvement of the security operation thereof, and in which the overflow of hot water through the upper opening of the case is prevented, and splashed hot water can be caught before it is splashed outside the case.

A seventh object of the invention is to provide a coffee-pot and coffee-mill combination in which a hot water pouring inlet is formed in the substantially central portion of the upper part of the case, a guide surface which is sloped in such a manner that, as it goes from the center to the periphery thereof, it diverges downwardly is formed as the inner surface of the upper part of the case, and a diffusing element having a sloped surface as its upper surface, which is inclined from the center towards the periphery thereof, is provided in the vicinity of the hot water pouring inlet of the case, whereby hot water to be supplied into the case through the hot water supplying inlet is guided along the guide surface of the case onto the coffee powder collected beside the inner wall of the case, so that a coffee liquid can be effectively extracted.

An eighth object of the invention is to provide a coffee-pot and coffee-mill combination in which the case is provided with a protrusion in such a manner that when the case is removed from the body of the combination and is placed on a horizontal surface such as that of a table, the level of the extracting outlet is higher than that of the lowest point of the inner bottom plate of the case, whereby when the case is placed on a horizontal surface such as that of a table, the flow of the coffee liquid left in the case can be prevented and accordingly a horizontal surface such as that of a table is never made dirty by the coffee liquid left in the case.

The novel features which are considered characteristic of this invention are set forth in the appended claims. This invention itself, however, as well as other objects and advantages thereof will be best understood by reference to the following detailed description of illustrative embodiments, when read in conjunction with the accompanying drawings, in which like parts are designated by like reference characters or numerals.

In the accompanying drawings:

FIG. 1 is a perspective view showing the first embodiment of the combination according to the invention.

FIG. 2 is a vertical sectional view showing the combination illustrated in FIG. 1.

FIG. 3 is a sectional view taken along line III—III in FIG. 2, showing a case covered with its cover.

FIG. 4 is an enlarged vertical sectional view showing the essential components of the combination shown in FIG. 1.

FIG. 5 is a diagram showing an electrical circuit of the first example of the combination;

A first embodiment of a coffee-pot and coffee-mill combination according to this invention will be described with reference to FIGS. 1 through 5.

Figure 1:
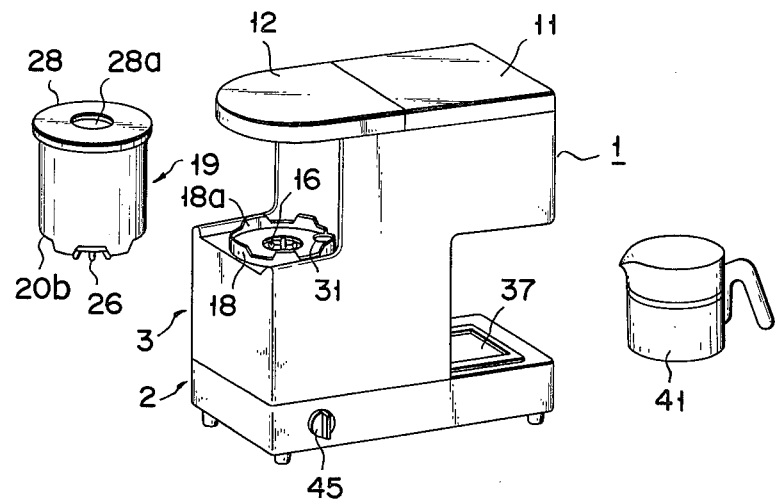
FIGS. 1 through 5 shows a first embodiment of a coffee-pot and coffee-mill combination according to this invention. More specifically.
Figure 2:
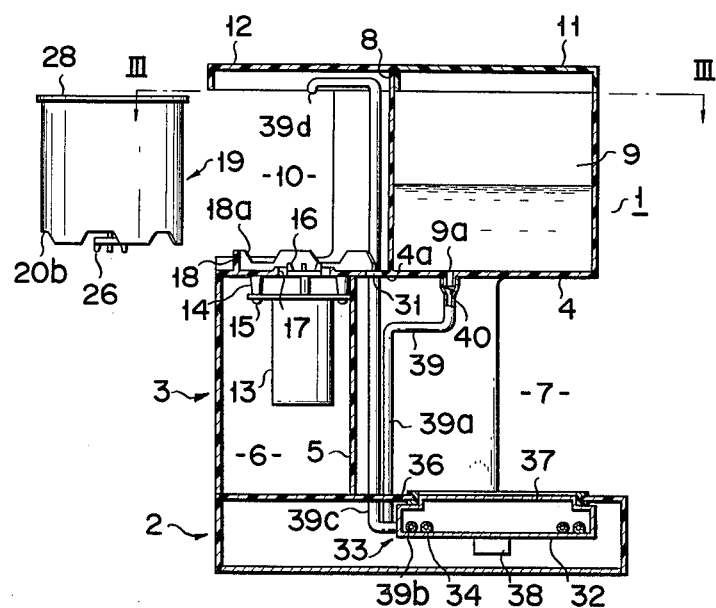
Figure 4:
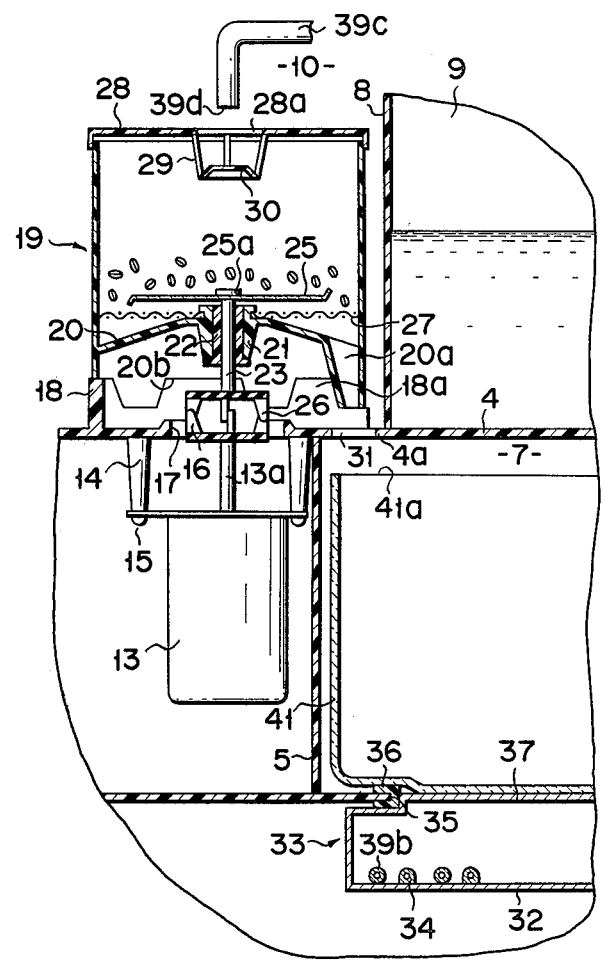

In these figures, reference numeral 1 designates the body of the coffee-pot and coffee-mill combination (hereinafter referred to merely as "a combination" when applicable). The body 1 of the combination comprises a base 2 in the form of a relatively flat rectangular container, and a frame 3 in the form of a rectangular box having openings in its upper and lower surfaces, the frame 3 being provided on the base 2. The frame 3 is divided by a horizontal partition plate 4 into an upper half section and a lower half section. The lower half section is divided by a lower vertical partition plate 5 into a right compartment and a left compartment. The left compartment is used as a motor accommodating section 6. A part of the right compartment is cut so as to receive a cup; that is, the right compartment is used as a cup accommodating section 7. The upper half section of the frame 3 is also divided by an upper vertical partition plate 8 into a right compartment and a left compartment. This right compartment is above the cup accommodating section 7 and is used as a water storing tank 9. A part of the left compartment of the upper half section in the frame 3 is cut so that the left compartment is used as a case accommodating section 10 positioned above the motor accommodating section 6. The upper left portion of the cup accommodating section 7 is partly overlapped on the lower right portion of the case accommodating section 10 substantially at the central portion of the horizontal partition plate 4, thereby to provide an overlap section 4a, as shown in FIGS. 2 and 4. In FIG. 2, reference numeral 11 designates a cover which is detachably mounted on the upper opening of the water storing tank 9, reference numeral 12 designates a top plate for the case accommodating section 10, which is extended from the upper vertical partition plate 8 as one unit, reference numeral 13 designates an electric motor which is mounted on the lower surface of the horizontal partition plate 4 with protrusions 14 and screws 15 in the motor accommodating section 6. The rotary shaft 13a of the motor 13 is extended upwardly, and the upper end portion of the rotary shaft 13a is connected to a coupling 16 which is extended into the case accommodating section 10 through an insertion hole 17 formed in the horizontal partition plate 4. A substantially annular mounting base 18 is provided on the horizontal partition plate 4 in the case accommodating section 10 in such a manner that the mounting base 18 surrounds the insertion hole 17. The mounting base 18 has a number of protrusions 18a on its upper surface. A case 19 is cylindrical and has the bottom 20 which is in the form of a cone diverging downwardly or towards the peripheral edge thereof. An extracting outlet 20a directed downwardly is formed in a part of the peripheral edge. Recesses 20b, which are engaged with the protrusions 18a of the mounting base 18, are formed in the peripheral edge. A shaft cylinder 21 is integral with the central portion of the bottom 20 of the case 19. Reference numeral 23 designates a driving shaft which is vertically inserted into the shaft cylinder 21 and is supported by a bearing metal 22. A cutter 25 as a grinder for grinding coffee-beans is detachably mounted with a screw 25a on the upper end portion of the driving shaft 23. The lower end portion of the driving shaft 23 is connected to a coupling 26 coupled to the aforementioned coupling 16. One of the coupling 16 and 26 is made of an elastic material such as rubber. A filer 27 is detachably provided below the cutter 25 in the case 19. Reference numeral 28 designates a cover which is detachably placed over the upper opening of the case 19. A receiving inlet 28a is formed in the central portion of the cover 28. In the central portion of the cover 28, there is provided a diffusion plate 30 by means of mounting pieces 29 in such a manner that the diffusion plate 30 is confronted with the receiving inlet 28a. A communicating hole 31 is formed in the aforementioned overlap section 4a, so as to communicate the case accommodating section 10 with the cup accommodating section 7. The position of the communicating hole is so determined that, when the case 19 is put in place on the mounting base, the communicating hole is aligned with the extracting outlet 20a of the case, as described later. Furthermore, when the case 19 is mounted in place on the mounting base, the axis of the driving shaft 23, i.e., the axis of the case 19 is aligned with the axis of the rotary shaft 13a of the motor 13. Reference numeral 32 designates a heater unit or a heating section, which forms a hot water supplying device 33 with the water storing tank 9. The heater unit 32 is made in the form of a relatively flat container of a material excellent in heat conductivity, and has a sheathed heater 34 arranged in zigzag stage on the bottom thereof. The heater unit 32 is mounted water-tightly through a water-proof packing 36 in an opening 35 which is formed in the upper surface of the base 2, so that a part of the heater unit appears in the cup accommodating section 7. When the heater unit 32 is mounted therein, the upper surface of the heater is flush with the upper surface of the base, and the upper surface of the heater unit is used as a cup placing section 37 on which the cup is placed. A temperature controlling thermostat 38 is provided on the lower surface of the bottom of the heater unit 32. A pipe assembly 39 is a part of the hot water supplying device 33, and comprises a water supplying pipe 39a, a heating pipe 39b and a hot water supplying pipe 39c. One end of the water supplying pipe 39a is connected to a water supplying inlet 9a provided in the bottom of the water storing tank 9, and the other end is connected to one end of the heating pipe 39b which is arranged in zigzag state along the sheathed heater 34 on the bottom of the heater unit 32. The other end of the heating pipe 39b is connected to one end of the hot water supplying pipe 39c, the other end of which is extended to the upper portion of the case accommodating section 10. The hot water upplying outlet 39d of the hot water supplying pipe 39c is so arranged that when the case 19 is mounted on the mounting base 18, it confronts the receiving inlet 28a of the cover 28 from above.

Reference numeral 40 designates a check valve provided at the lower end of the water supplying outlet 9a of the water storing tank 9, and reference numeral 41 designates a cup which is placed on the cup placing section 37. The extracting outlet 20a of the case 19 is so designed that, when the case 19 is put in place on the mounting base 18, it confronts the case accommodating section side 41a of the upper opening of the cup 41 through the communicating hole 31 formed in the overlap section 4a. The extracting outlet 20a is formed in a part of the wall of the case 19, without protruding outside. Therefore, the case accommodating section side 41a of the upper opening of the cup 41 is partly overlapped with the case 19 as viewed from top (cf. FIG. 3).

Figure 5:
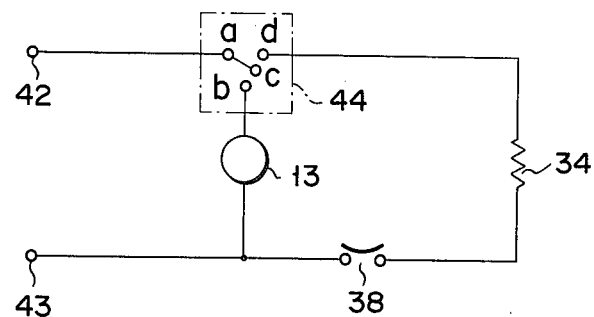

An electric circuit provided for the coffee-pot and coffee-mill combination will be described with reference to FIG. 5, in which reference numerals 42 and 43 designates terminals connected to a single phase AC source of 100 volts for instance, and reference numeral 44 designates a manually operated change-over switch (its operating knob 45 being shown in FIG. 1), which has a movable contact (or an armature) a and stationary contacts b, c and d. A series circuit of the contacts a and b of the change-over switch 44 and the motor 13 is connected between the terminals 42 and 43. The stationary contact d of the change-over switch 44 is connected through a series circuit of the sheathed heater 34 and the thermostat 38 to the common connection point of the motor 13 and the terminal 43. The stationary contact c of the change-over switch 44 is an idle contact.

The operation of the coffee-pot and coffee-mill combination thus constructed will be described.

Figure 3:
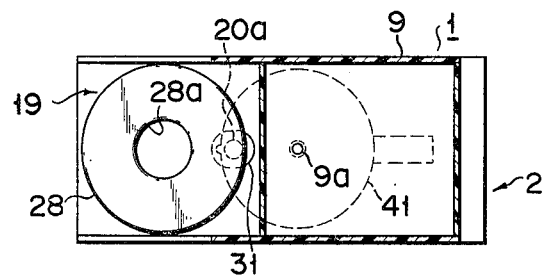

A predetermined amount of water (sufficient for serving for four persons, in general) is poured into the water storing tank 9, and then a predetermined quantity of coffee-beans to be ground are put in the case 19. Thereafter, the case 19 and the water storing tank 9 are covered with the respective covers 28 and 11. Then, the case 19 is mounted in place on the mounting base 18 by allowing the recesses 20b to engage with the protrusions 18a so as to prevent the case from being turned. Simultaneously, the couplings 26 and 16 are coupled to each other, the receiving inlet 28a of the cover 28 is confronted with the hot water supplying oulet 39d of the hot water supplying pipe 39c, and the extracting outlet 20a is confronted with the communicating hole 31 (FIG. 3). When the cup 41 is placed on the cup placing section 37 in the cup accommodating section 7, the extracting outlet 20a of the case 19 is confronted through the communicating hole 31 with the inside of the cup 41. Thereafter, the operating knob 45 is operated to short-circuit the contacts a and b of the change-over switch 44, as a result of which the motor 13 is energized. The rotation of the rotary shaft 13a of the motor is transmitted through the couplings 16 and 26 and the driving shaft 23 to the cutter 25, to rotate the latter 25. The coffee-beans are ground by the rotating cutter 25 to a suitable grain size, whereby coffee powder is obtained. Upon completion of grinding the coffee-beans to the suitable grain size, the operating knob 45 is operated to trip the armature from the contact b to the contact d. As the short-circuit between the contacts a and b is released, the motor 13 is deenergized to stop its rotation. On the other hand, as the contacts a and d are short-circuited, current is applied to the sheathed heater 34 in the heater unit 32, as a result of which the heater 34 is heated and the water in the heating pipe 39b is heated. Soon, the water in the heating pipe 39b is boiled. The boiled water, i.e., the hot water rises along the hot water supplying pipe 39c and drop towards the receiving inlet 28a from the hot water supplying outlet 39d. The hot water, being spread out by the diffusing plate 30, drops onto the coffee powder. Thus, the hot water is passed through the coffee powder and filtered by the filter 27, and finally the coffee liquid is extracted into the cup 41 through the extracting outlet 20a and the communicating hole 31. As the sheathed heater 34 generates heat, the cup placing section 37 which is the upper surface of the heater unit 32 is heated. Therefore, the cup 41 is also heated through the cup placing section 37. When the water in the heating pipe 39b is boiled, the boiled water tends to rise along the water supplying pipe 39a to flow back into the water storing tank 9; however, this back flow is prevented by the check valve 40. Supplying water into the heating pipe 39b is achieved in the following manner: The hot water in the heating pipe 39b is delivered into the hot water supplying pipe 39c by the pressure which is developed when the water in the heating pipe is boiled, as a result of which a negative pressure is created on the side of the water supplying pipe 39a. Therefore, the check valve 40 is opened, so that water is supplied from the water storing tank 9 through the water supplying pipe 39a into the heating pipe 39b. In the manner as described above, the water in the water storing tank 9 is continuously supplied, as hot water, into the case 19 through the pipe assembly 39, and is extracted as coffee liquid out of the case 19 into the cup 41. If all the coffee liquid cannot be taken, the remaining coffee liquid can be maintained at a suitable temperature by means of the thermostat by placing the cup 41 on the cup placing section 37 again.

After the completion of coffee liquid extraction, i.e., after the use of the combination, the case is removed from the mounting base 18. Then, the case is washed to remove the coffee-dregs.

As is apparent from the above description, in the example of the coffee-pot and coffee-mill combination according to the invention, the body 1 is provided with the case 19 having the cutter 25 and the filter 27, and the hot water supplying device 33, and after coffee-beans are ground by the cutter 25 in the case 19, hot water is supplied into the case 19 from the hot water supplying device 33 to obtain a mixture of hot water and coffee powder, which is filtered by the filter 27 to obtain a coffee liquid. Thus, the combination can satisfies the condition to obtain a delicious coffee liquid, that "immediately after coffee-beans are ground, hot water is poured into the coffee powder and the mixture of hot water and coffee powder is filtered". Accordingly, with the combination, it is possible to obtain a coffee liquid delicious and rich in flavor, without losing the scent of coffee-bean. In addition, as was described above, all the processes from grinding coffee-beans to extracting a coffee liquid can be performed with only one coffee-pot and coffee-mill combination according to the invention. Accordingly, the area occupied by the combination according to the invention is small when compared with the conventional case where two devices, namely, the coffee grinder and the coffee extractor, are used. Furthermore, the maintenance of the combination is easy, the operation is simple, and the cleaning is also simple. As no coffee powder is scattered outside, there is no trouble involved in the use of the combination. In addition, since the case 19 can be detachably mounted on the body 1, it is possible to remove only the case 19 from the body 1 to wash it, and the cleaning work to remove the coffee-dregs left in the case 19 can be readily achieved.

In the above described embodiment of the combination, the case accommodating section 10 is provided above the motor accommodating section 6, and when the case 19 is mounted in place on the mounting base in the case accommodating section 10, the axis of the driving shaft 23 of the grinder 25, or the axis of the case 19 is on the extension line of the axis of the rotary shaft 13a of the motor 13. Therefore, the rotation of the rotary shaft 13a can be transmitted through the couplings 16 and 26 to the driving shaft 23. In the case where, for instance, the axis of the driving shaft 23 is not aligned with the axis of the rotary shaft 13a, that is, the case 19 is placed at the position of the water storing tank 9, it is necessary to provide a belt transmission mechanism between the rotary shaft 13a of the motor 13 and the driving shaft 23 and accordingly to provide a space for the mechanism. However, the provision of such a transmission mechanism is unnecessary for the above-described combination can be miniaturized in the lateral direction of the body as much. Furthermore, in the combination, the cup accommodating section 7 is provided on the right hand side of the motor accommodating section 6 and adjacent thereto, and the case accommodating section 10 and the cup accommodating section 7 are partly, in a plane, overlapped with each other through the overlap section 4a, and in addition when the case 19 is mounted in place on the mounting base 18 and the cup 41 is placed on the cup placing section 37, the case 19 and the cup 41 are partly overlapped with each other as viewed from top. Therefore, the combination can be miniaturized also in the longitudinal direction of the body 1. Thus, the combination can be miniaturized in both of the lateral and longitudinal directions of the body 1. That is, the dimensions of the combination can be greatly reduced, and accordingly a space occupied by the combination can also be considerably reduced.

In the above-described embodiment of the combination, the axis of the driving shaft 23 of the cutter 25 is on the upper extension line of the axis of the rotary shaft 13a of the motor 13; however, if the case is above the motor, it is not always necessary to align the axis of the rotary shaft of the motor with the axis of the driving shaft of the cutter, namely, the grinder; that is, for instance if worm gear means of the like is used, the axis of the rotary shaft of the motor may be orthogonal with the axis of th driving shaft of the grinder.

Furthermore in the first embodiment, coffee-beans are ground by the cutter 25; however, a grinder (or a mortar type grinder) operating to crush coffee-beans into small pieces by beating them may be employed.

In addition, in the first embodiment, a so-called drip type hot water supplying device 33, which allows hot water to drip into the case 19 with the aid of the boiling pressure, is employed; however, the invention is not limited thereto or thereby; that is, a siphon type hot water supplying device or a pot type hot water supplying device or a so-called head type hot water supplying device which allows hot water to drip by its weight may be employed.

A second embodiment of the coffee-pot and coffee-mill combination according to the invention will be described with reference to FIGS. 6 and 7.

Figure 7:
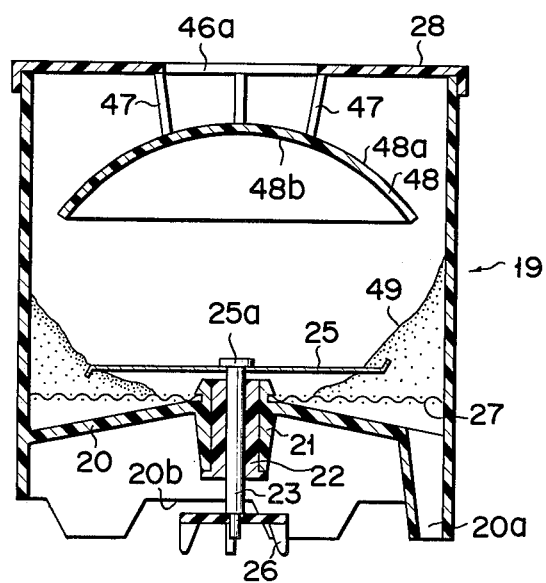
FIG. 7 is an enlarged vertical sectional view showing a case shown in FIG. 6.
Figure 6:
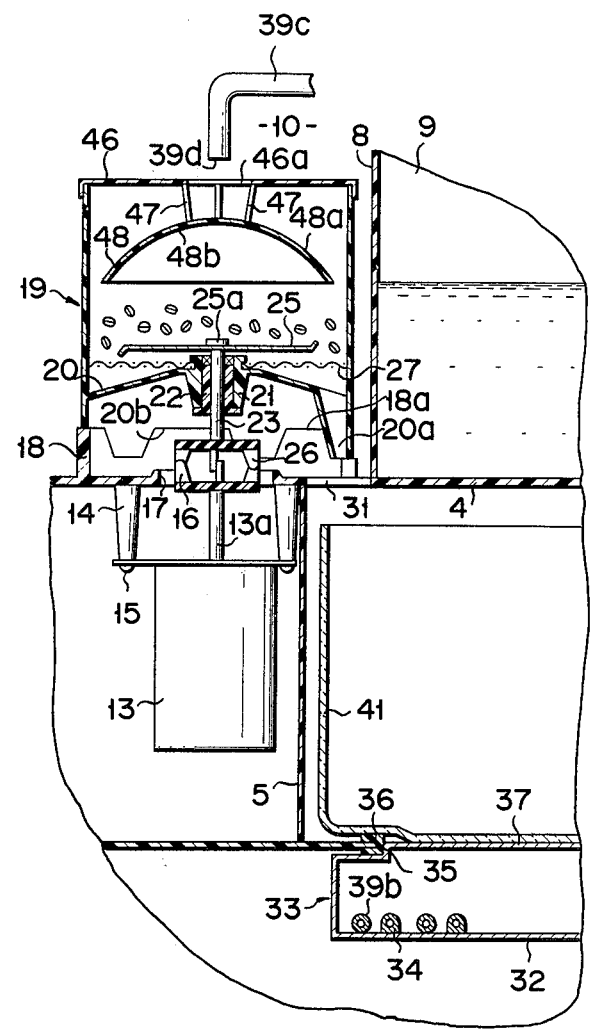
FIG. 6 is an enlarged vertical sectional view showing the essential components of a second embodiment of the combination according to the invention.

In FIGS. 6 and 7, reference numeral 46 designates a cover member which is placed detachably over the upper opening of a case 19. A hot water pouring inlet 46a is formed in the central portion of the cover member 46. A diffusing element 48 is secured to the lower surface of the cover member 46 with a plurality of mounting pieces 47 in such a manner that the diffusing element confronts the hot water pouring inlet 46a from below. The diffusing element 48 is substantially spherical, and the peripheral edge of the diffusing element 48 is adjacent to the inner wall of the case 19 with a predetermined air gap therebetween. Furthermore, the upper and lower surfaces of the spherical diffusing element 48 are gradually sloped towards the peripheral edge thereof so that they are employed as upper and lower guides 48a and 48b. The remaining parts are similar to those in the first embodiment.

The operation of the second embodiment of the combination thus constructed will be described. First, a predetermined amount of water (sufficient for serving for four persons, in general) is poured into the water storing tank 9, and a predetermined quantity of coffee-beans to be ground are put in the case 19. Thereafter, the case 19 and the water storing tank 9 are covered with the respective covers 46 and 11. Then, the case 19 is mounted in place on the mounting base 18 by allowing the recesses 20b to engage with the protrusions 18a so as to prevent the case from being turned. At the same time, the couplings 16 and 26 are coupled to each other, the hot water pouring inlet 46a of the cover member 46 is confronted with the the hot water supplying outlet 39d of the hot water supplying pipe 39c, and the extracting outlet 20a is confronted with the communicating hole 31 (FIG. 6).

When the cup 41 is placed on the cup placing section 37 in the cup accommodating section 7, the extracting outlets 20a of the case 19 is confronted through the communicating hole 31 with the inside of the cup 41. Thereafter, the operating knob 45 is operated to short-circuit the contacts a and b of the changeover switch 44, as result of which the motor 13 is energized. The rotation of the rotary shaft 13a of the motor is transmitted through the couplings 16 and 26 and the driving shaft 23 to the cutter 25, to rotate the latter 25. The coffee-beans are ground by the rotating cutter 25 to a suitable grain size, whereby coffee powder is obtained. In this operation, the coffee-beans may be splashed above or pushed upwardly by the rotation of the cutter 25; however, the coffee-beans thus splashed or pushed are guided by the lower guide 48b of the diffusing element 48 towards the area surrounding the cutter 25 because the lower guide 48b is sloped towards the lower portion of the inner wall of the case 19, as a result of which the coffee-beans are finally ground. The case 19 serves also as a filter case for extracting a coffee liquid, and the internal volume of the case is relatively large in order to prevent the overflow of hot water which may be caused when the coffee-liquid is extracted; that is, the size of the case is excessively large as a grinding case. Therefore, the case may suffer from a problem that the grinding efficiency is degraded because no means for detaining coffee-beans is provided in grinding them. However, since the diffusing element 48 serves to guide coffee-beans downwardly by detaining them, grinding the coffee-beans can be smoothly and effectively carried out, in this invention.

Upon completion of grinding the coffee-beans to the desired gain size, the operating kob 45 is operated to trip the armature from the contact b over to the contact d. As the short-circuit between the contacts a and b is released, the motor 13 is deenergized to stop its rotation. On the other hand, as the contacts a and d are short-circuited, current is supplied to the sheathed heater 34 in the heater unit 32, as a result of which the heater 34 is heated and the water in the heating pipe 39b is heated. Soon, the water in the heating pipe 39 is boiled. The boiled water, i.e., the hot water rises along the hot water supplying pipe 39c and drips towards the hot water pouring inlet 46a from the hot water supplying outlet 39d. The hot water, being spread out by the diffusing element 48, further drips onto the coffee powder 49. Thus, the hot water is passed through the coffee powder and filtered by the filter 27, as a result of which the coffee liquid is extracted by means of the extracting outlet 20a and poured into the cup 41.

In the above-described operation, when the rotation of the cutter 25 is stopped after the coffee-beans have been ground by the cutter 25, the coffee powder 49, being splashed outwardly by the centrifugal force of the rotating cutter 25, has been collected in the vicinity of the lower portion of the inner wall of the case 19 as shown in FIG. 7. However, as the hot water supplied into the case 19 through the hot water pouring inlet 46a is guided down towards the inner wall of the case 19 by the upper guide of the diffusing element 48, the hot water is positively allowed to drip onto the coffee powder 49. As the sheathed heater 34 generates heat, the cup placing section 37, which is the upper surface of the heater unit 32, is heated. Therefore, the cup 41 is also heated through the cup placing section 37. When the water in the heating pipe 39b is boiled, the boiled water tends to rise along the water supplying pipe 39 to flow back into the water storing tank 9; however, this back flow is prevented by the check valve 40. Supplying water into the heating pipe 39b is achieved in the following manner: The hot water in the heating pipe 39b is delivered into the hot water supplying pipe 39c by the pressure which is developed when the water in the heating pipe is boiled, as a result of which a negative pressure is created on the side of the water supplying pipe 39a. Therefore, the check valve is opened, so that water is supplied from the water storing tank 9 through the water supplying pipe 39a into the heating pipe 39b. In the manner as described above, the water in the water storing tank 9 is continuously supplied, as not water, into the case 19 through the pipe assembly 9, and is extracted as coffee liquid out of the case into the cup 41. In the case where all the coffee liquid cannot be taken, the remaining coffee liquid can be maintained at a suitable temperature if the cup 41 is placed on the cup placing section 37 again.

After the completion of coffee liquid extraction, i.e., after the use of the combination, the case is removed from the mounting base 18. Then, the case is washed to remove the coffee-dregs.

As is apparent from the above description, in the second embodiment of the coffee-pot and coffee-mill combination according to the invention, the body 1 is provided with the case 19 having the cutter 25 and the filter 27, and the hot water supply device 33, and after coffee-beans are ground by the cutter 25 in the case 19, hot water is supplied into the case 19 from the hot water supplying device 33 to obtain a mixture of hot water and coffee powder, which is filtered by the filter 27 to obtain a coffee liquid. Thus, similarly as in the first embodiment, the combination can satisfies the essential condition to obtain a delicious coffee liquid, that "immediately after coffee-beans are ground hot water is poured into the coffee-powder and the mixture of hot water and coffee powder is filtered". Accordingly, with the combination, it is possible to obtain a coffee liquid delicious and rich in flavor, without losing the scent of coffee-bean. In addition, all the processes from grinding coffee-beans to extracting a coffee liquid can be performed with only one coffee-pot and coffee-mill combination according to the invention. Therefore, the area occupied by the combination according to the invention is small when compared with the conventional case where two devices, namely, the coffee grinder and the coffee extractor, are used. Furthermore, the maintenance of the combination is easy, the operation is simple and the cleaning is also simple. As no coffee powder is scattered outside, there is no trouble involved in the use of the combination. In addition, since the case 19 can be detachably mounted on the body 1, it is possible to remove only the case from the body 1 to wash it, and the cleaning work to remove the coffee-dregs left in the case 19 can be readily achieved.

Furthermore, according to this embodiment of the combination, the substantially spherical diffusing element 48 is secured to the cover member 46 placed over the upper opening of the case 19 in such a manner that the diffusing element confronts the hot water pouring inlet 46a of the cover member 46 and is substantially adjacent to the inner wall of the case 19. Therefore, even if, in grinding coffee-beans, the coffee-beans are splashed or pushed upwardly by the rotation of the cutter 25, the coffee-beans thus spleashed or pushed upwardly are guided downwardly by the lower guide 48b of the diffusing element 48 towards the lower portion of the inner wall of the case 19, which surrounds the cutter 25, as a result of which the coffee-beans can be effectively ground. In addition, the hot water supplied through the hot water pouring inlet 46 is guided by the upper guide 48a of the diffusing element 48 downwardly towards the inner wall of the case 19, as a result of which the hot water is positively allowed to drip onto the coffee powder 49 collected in the vicinity of the lower portion of the inner wall of the case 19. Thus, the coffee liquid can be effective extracted. As the diffusing element 48 is confronted with the hot water pouring inlet 46a of the cover member 46 from below, the coffee-beans being ground and the coffee powder are never scattered out through the hot water pouring inlet 46a of the cover member 46.

In the above-described second embodiment of the combination according to the invention, the diffusing element 48 secured to the cover member 46 is substantially spherical; however, the invention is not limited thereto or thereby. That is, a protrusion may be provided in the substantially central portion of the diffusing element 48 in such a manner that it extends downwardly so as to facilitate the coffee-bean grinding operation of the cutter. The configuration of the diffusing element 48 may be substantially conical. Alternatively, the lower surface of the diffusing element may be flat. All that is necessary is to provide a diffusing element having the upper surface which is gradually inclined downwardly towards the periphery thereof.

A third embodiment of the coffee-pot and coffee-mill combination according to the invention will be described with reference to FIG. 8.

Figure 8:
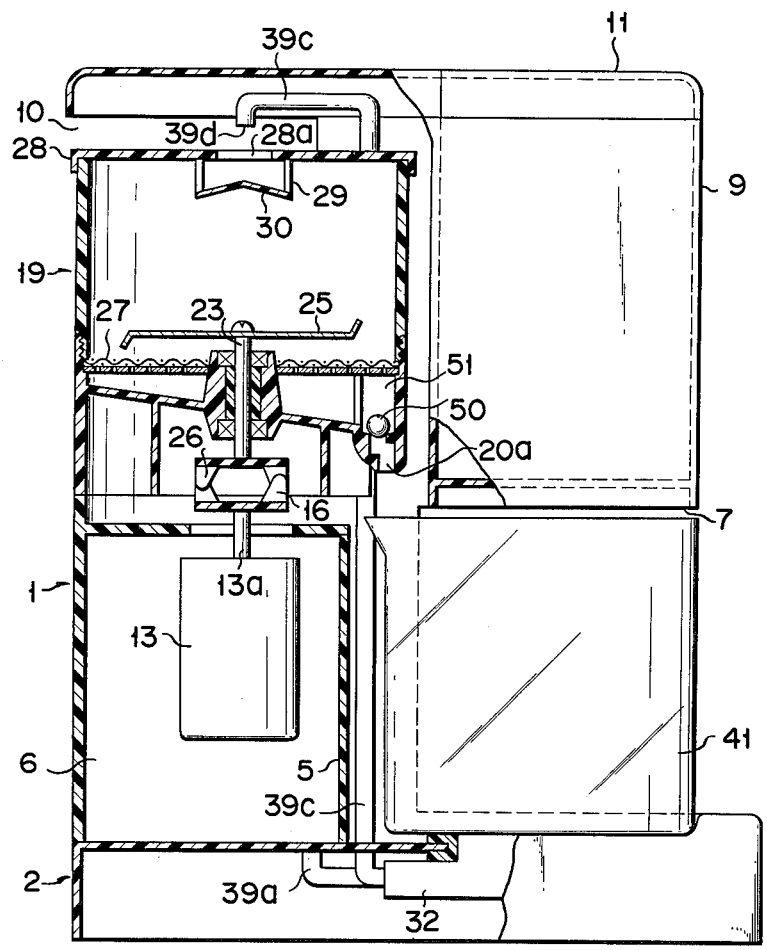
FIG. 8 is a sectional view showing a third embodiment of the combination according to the invention.

Referring to FIG. 8, reference numeral 20a designates an extracting outlet formed in the lowest portion of a bottom plate section. Provided above the extracting outlet 20a is a float chamber 51 having a substantially spherical float 50 serving as a valve. Reference numeral 28 designates a cover which is detachably placed over the upper opening of a case 19. A receiving inlet 28a is formed in the central portion of the cover 28 in such a manner that it confronts the hot water supplying outlet 39d of the hot water supplying pipe 39c described before. A diffusing plate 30 is secured to the lower surface of the cover 28 with mounting pieces 29 in such a manner that the diffusing plate confronts the receiving inlet 28a. The remaining parts of the combination are similar to those in the abovedescribed first and second embodiments.

The operation of the third embodiment of the combination will be described. First, a predetermined quantity of water is poured into the water storing tank 15, and a predetermined quantity of coffee-beans are put in the case 19. Then, the motor 13 is energized. As a result, the cutter 25 is rotated via the couplings 16 and 26, whereby the coffee-beans are ground to a predetermined grain size. Upon completion of grinding the coffee-beans, the motor is deenergized, and instead the sheathed heater 34 in the heater unit 32 is energized. Soon, the water supplied into the heater unit by the water supplying pipe 39a is heated and boiled. The boiled water rises along the hot water supplying pipe 39c and drips through the hot water supplying outlet 39d. The hot water, being struck against the diffusing plate 30 through the receiving inlet 28a, is spread out towards the inner wall of the case 19, and is finally allowed to drip onto the coffee powder accumulated on the filter 27. As a result, the hot water is mixed with the coffee powder, and the mixture is filtered by the filter 27, whereby a coffee liquid is extracted out of the mixture. The coffee liquid thus extracted flows along the bottom plate section into the float chamber 51 and pushes the float 50 upwardly. Thus, the hot coffee liquid is allowed to drip into the cup 41 through the extracting outlet. The cup 41 placed on the heater 32 is suitably preheated or maintained at a suitable temperature.

When all the water in the water storing tank 9 is boiled by the heater unit 32, supply of hot water into the case 19 is ended. A predetermined period of time after this, extraction of the coffee liquid from the mixture of hot water and coffee powder is also ended. Then, the extracting outlet 20a is closed by the float 50 in the float chamber 51. Accordingly, the supply of current to the sheathed heater 34 in the heater unit 32 should be interrupted when the supply of hot water is ended as described above.

In the above-described third embodiment, the extracting outlet 20a is closed by the float 50 in the float chamber 51. If the float is not provided, the remaining coffee liquid stuck on the inner wall of the case 19 or still contained in the coffee powder on the filter 27 is allowed to irregularly drip through the extracting outlet 20a with the lapse of time. Therefore, after the cup 41 has been taken out, the coffee liquid drips onto the base 2 of the cup accommodating section 7, as a result of which the surface of the base 2 or the surface of the heater unit 32 is made dirty thereby. Furthermore, while the case 19 removed from the body 1 is brought to a sink or the like in order to discard the coffee-dregs, the remaining coffee liquid may drip irregularly through the extracting outlet 20, which may make the floor or the clothes dirty. However, in the third embodiment, the extracting outlet 20a is closed by the float in such cases, and therefore the above-described troubles-after the cup 41 has been taken out of the body, the surface of the base 2 or the heater unit 32 is made dirty or the floor or the clothes are made dirty while the case is brought to a sink or the like—are never caused.

Figure 9:
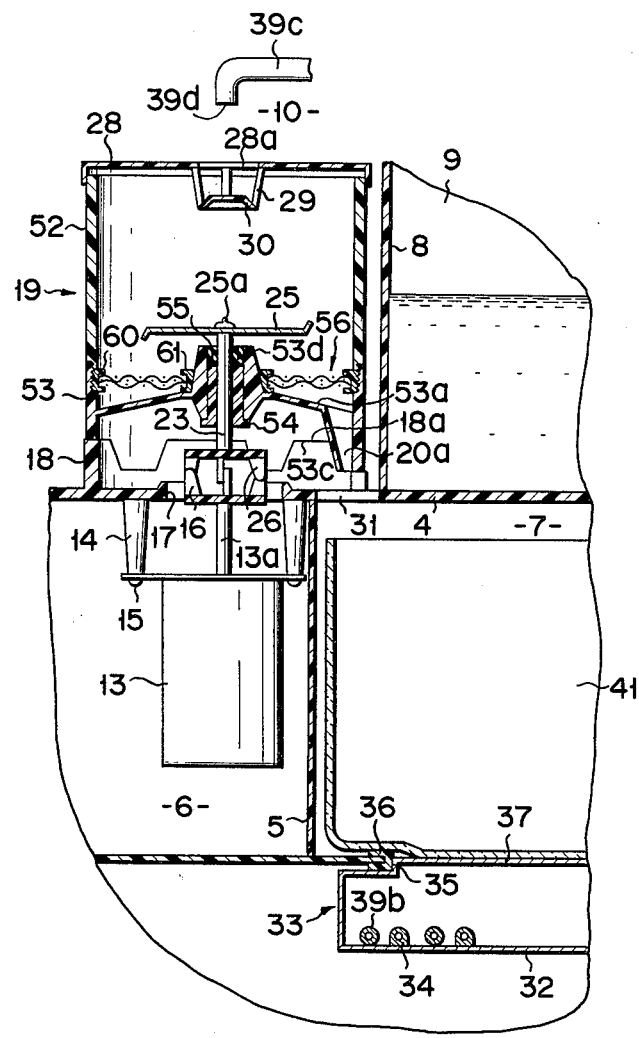
FIG. 9 is an enlarged vertical sectional view showing the essential components of a fourth embodiment of the combination according to the invention.
Figure 10:
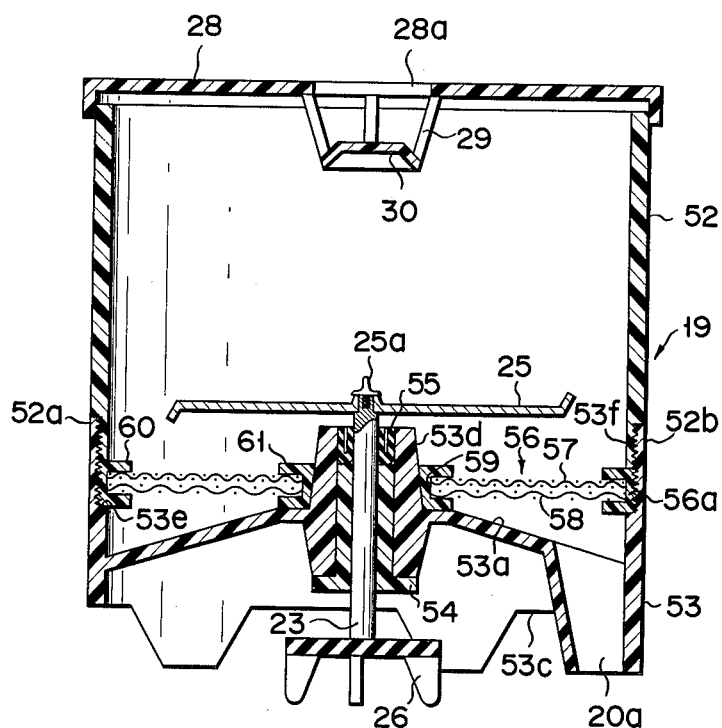
FIG. 10 is an enlarged vertical sectional side view showing a case shown in FIG. 9.

A fourth embodiment of the coffee-pot and coffee-mill combination according to the invention will be described with reference to FIGS. 9 and 10.

Referring to these figures, reference numeral 19 designates a case assembly having an upper half case 52 and a lower half case 53. The upper half case 52 is cylindrical, and the lower end portion of the cylindrical upper half case 52 is smaller in diameter that the remaining portion thereof, forming a step section 52a. The outer surface of the lower end portion smaller in diameter of the upper half case 52 is threaded to form a threaded section 52b. The lower half case 53 is also in the form of a cylinder with a bottom, which is equal to the upper half case 52 in outside and inside diameters. The bottom 53a of the lower half case 53 is inclined towards its peripheral edge, in a part of which an extracting outlet 20a is formed. Recesses 53c are formed in the outermost peripheral edge portion of the lower half case 53 so that they can be engaged with protrusions 18a formed on a mounting base 18. A shaft cylinder 53d is extended from the central portion of the bottom 53a. The inside diameter of the upper portion of the lower half case 53 is larger than the inside diameter of the remaining portion of the same, thereby forming a step section 53e. The upper portion larger in inside diameter of the lower half case 53 is threaded to form a threaded section 53f which can be engaged with the aforementioned threaded section 52b. A driving shaft 23 is inserted vertically into the shaft cylinder 53d through a bearing metal 54 and a water-tight member 55. Detachably mounted on the upper portion of the driving shaft 23 with a screw 25a is a cutter 25, namely, a grinder adapted to grind coffee-beans. A coupling 26 which is coupled to another coupling 16 is secured to the lower end portion of the driving shaft 23 with screws or the like. At least one of the couplings 16 and 26 is made of an elastic material such as rubber.

Reference numeral 56 designates a filter assembly comprising an upper fine filter 57 and a lower coarse filter 58, which are made of metal such as stainless steel. The outside diameter of the filter assembly 56 is slightly smaller than the inside diameter of the case assembly 19, and the filter assembly 56 has an opening 59 at the center, whose diameter is slightly larger than the diameter of the shaft cylinder 53d mentioned above. Annular packings 60 and 61 are placed over the outer peripheral edge 56a, and the inner peripheral edge (or the opening 59), of the filter assembly 56, respectively. These packings 60 and 61 are made of, for instance, rubber or synthetic resin. It is preferable that the packings are made of an elastic material; however, it is not always necessary, that is, the packings may be made of a non-elastic material.

The case assembly 19 is assembled as follows: First, the packings 60 and 61 are fixed to the filter assembly 56. Then, after the shaft cylinder 53d is inserted into the opening 59 of the filter assembly 56, the cutter 25 is mounted on the driving shaft 23 with the screw 25a. Thereafter, the upper half case 52 and the lower half case 53 are put together by engaging the threaded section 53f with the threaded section 52b in such a manner that the packing 60 is clamped by the lower end of the upper half case 52 and the upper end of the lower half case 53. As a result, the upper half case 52 is water-tightly connected to the lower half case 53 by means of the packing 60.

Reference numeral 28 designates a cover which is detachably placed over the upper opening of the case assembly 19 and has a receiving inlet 28a at the central portion. A diffusing plate 30 is secured to the lower surface of the cover 28 with mounting pieces 29 in such a manner that the diffusing plate 30 confronts the receiving inlet 28a. The remaining components are similar to those in the first embodiment. p The operation of the fourth embodiment of the coffee-pot and coffee-mill combination according to the invention will be described. First, a predetermined amount of water (sufficient for serving for four persons, in an ordinary case) is poured into the water storing tank 9, and a predetermined amount of coffee-beans to be ground are put into the case assembly 19. Then, the case assembly 19 and the water storing tank 9 are covered with the respective covers 28 and 11. Thereafter, case assembly 19 is mounted in place on the mounting base 18 by allowing the recesses 53c to engage with the protrusions 18a so as to prevent the case assembly 19 from being turned. As a result, the couplings 16 and 26 are coupled to each other, the receiving inlet 28a of the cover 28 is confronted with the hot water supplying outlet 39d of the hot water supplying pipe 39c, and the extracting outlet 20a is confronted with the communicating hole 31 (cf. FIG. 9). When the cup 41 is placed on the cup placing section 37 in the cup accommodating section 7, the extracting outlet 20a of the case assembly 19 is confronted through the communicating hole 31 with the inside of the cup 41. Thereafter, the operating knob 45 is operated to short-circuit the contacts a and b of the change-over switch 44, as a result of which the motor 13 is energized. The rotation of the rotary shaft 13a of the motor is transmitted through the couplings 16 and 26 and the driving shaft 23 to the cutter 25. The coffee-beans are ground by the rotating cutter 25 to a suitable grain size, whereby coffee powder is obtained. Upon completion of the grinding operation, the operating knob 45 is operated to trip its armature from the contact b over to d. As the short-circuit between the contacts a and b is released, the motor 13 is deenergized. On the other hand, as the contacts a and d are short-circuited, current is applied to the sheathed heater 34 in the heater unit 32, as a result of which the water in the heating pipe 39b is heated. Accordingly, soon, the water in the heating pipe 39b is boiled. The boiled water, or the hot water, rises along the hot water supplying pipe 39c and drips towards the receiving inlet 28a from the hot water supplying outlet 39d. The hot water, being spread out by the diffusing plate 30, drops onto the coffee powder. Thus, the hot water is passed through the coffee powder, and filtered by the filter 56, and finally the coffee liquid is extracted into the cup 41 through the extracting outlet 20a. As the sheathed heater 34 generates heat, the cup placing section 37 which is the upper surface of the heater unit 32 is heated. Therefore, the cup 41 is also heated through the cup placing section 37. When the water in the heating pipe 39b is boiled, the boiled water tends to rise along the water supplying pipe 39a to flow back into the water storing tank 9; however, this back flow is prevented by the check valve 40. Supplying water into the heating pipe 39b is achieved in the following manner: The hot water in the heating pipe 39b is delivered into the hot water supplying pipe 39c by the pressure which is developed when the water in the heating pipe is boiled, as a result of which a negtive pressure is created on the side of the water supplying pipe 39a. Therefore, the check valve 40 is opened, so that water is supplied from the water storing tank 9 through the water supplying pipe 39a into the heating pipe 39b. In this manner, the water in the water storing tank 9 is continuously supplied, as hot water, into the case assembly 19 through the pipe assembly 39, and is extracted as coffee liquid out of the case assembly 19 into the cup 41. If all the coffee liquid cannot be taken, the remaining coffee liquid can be maintained at a suitable temperature by means of the thermostat 38 by placing the cup on the cup placing section 37 again.

After the completion of coffee liquid extraction, i.e., after the use of the combination, the case assembly 19 is removed from the mounting base 18. Then, the case assembly is disassembled into the upper half case 52 and the lower half case 53 by disengaging the threaded section 52b from the threaded section 53f. The cutter is removed from the driving shaft 23 by unscrewing the thumb screw 25a. The filter assembly 56 is disengaged from the shaft cylinder 53d. Thereafter, these components thus disassembled or removed are washed with water.

As is clear from the above-description, in the fourth embodiment of the coffee-pot and coffee-mill cobination according to the invention, the body 1 is provided with the case assembly 19 having the cutter 25 and the filter assembly 56 and the hot water supplying device 33, and after coffee-beans are ground by the cutter 25 in the case assembly 19, hot water is supplied into the case assembly 19 from the hot water supplying device 33 to obtain a mixture of hot water and coffee powder, which is filtered by the filter assembly 56 to obtain a coffee liquid. Thus, the combination can satisfies the essential condition to obtain a delicious coffee liquid, that "immediately after coffee-beans are ground, hot water is poured into the coffee powder and the mixture of hot water and coffee powder is filtered". Accordingly, with the combination, it is possible to obtain a coffee liquid delicious and rich in flavor, without losing the scent of coffee-bean. In addition, as was described above, all the processes from grinding coffee-beans to extracting a coffee liquid can be performed with only one coffee-pot and coffee-mill combination according to the invention. Accordingly, the area occupied by the combination is small when compared with the conventional case where two devices, namely, the coffee grinder and the coffee extractor, are used. Furthermore, the maintenance of the combination is easy, the operation is simple, and the cleaning is also simple. As no coffee powder is scattered outside, there is not trouble involved in the use of the combination.

In addition, in the fourth embodiment described above, the case assembly 19 can be detachably mounted on the body 1, the case assembly 19 itself can be disassembled into the upper half case 52 and the lower half case 53, and the cutter 25 and the filter assembly 56 can be detachably mounted in the case assembly 19. Accordingly, after the upper half case 52, the cutter 25 and the filter assembly 56 are removed from the case assembly 19, these components can be cleaned with water. Thus, the cleaning of the components of the combination can be readily achieved, and especially coffee-dregs stuck on the filter assembly 56 can be readily cleaned. As the periphery of the filter assembly 56 is positively clamped between the upper half case 52 and the lower half case 53, the filter assembly 56 is never displaced by vibration or the like when the combination is used and especially when coffee-beans are ground by the cutter 25.

Furthermore, according to the fourth embodiment, the outer periphery 56a, and the inner periphery (or the opening 59), of the filter assembly 56 are covered with the packings 60 and 61, respectively. Accordingly, the fraying of the net of the filter assembly 56 can be positively prevented, and the upper filter 57 and the lower filter 58 are tightly assembled, which facilitates the handling of the filter assembly 56 when removed. As the packing 60 is clamped between the lower end of the upper half case 52 and the upper end of the lower half case 53, the packing 60 serves as water-proof means for water-tightly connecting the upper half case 52 to the lower half case 53. Therefore, no hot water is leaked from between the upper half case and the lower half case.

In the fourth embodiment described above, the filter assembly 56 and the packings 60 and 61 are separately provided and are assembled together. However, packings may be molded with synthetic resin integrally with the outer and inner peripheries of such a filter assembly 56.

In addition, in the fourth embodiment, coffee-beans are ground by the cutter 25; however, a grinder (or a mortar type grinder) operating to crush coffee-beans into small piece by beating them may be employed.

Figure 11:
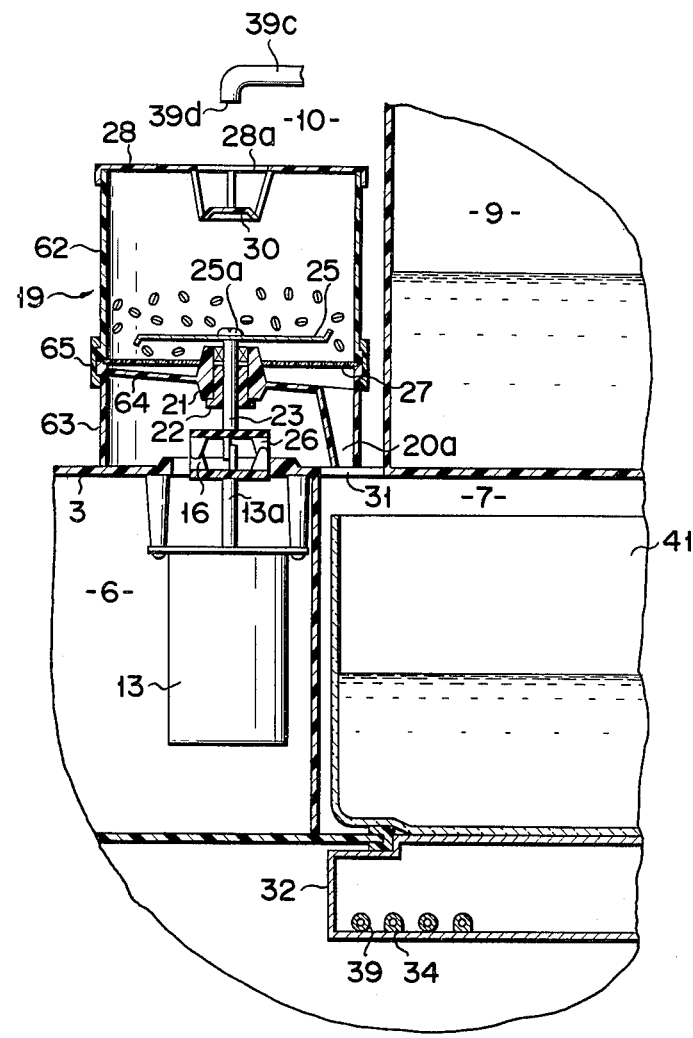
FIG. 11 is an enlarged vertical sectional view showing a fifth embodiment of the combination according to the invention.
Figure 12:
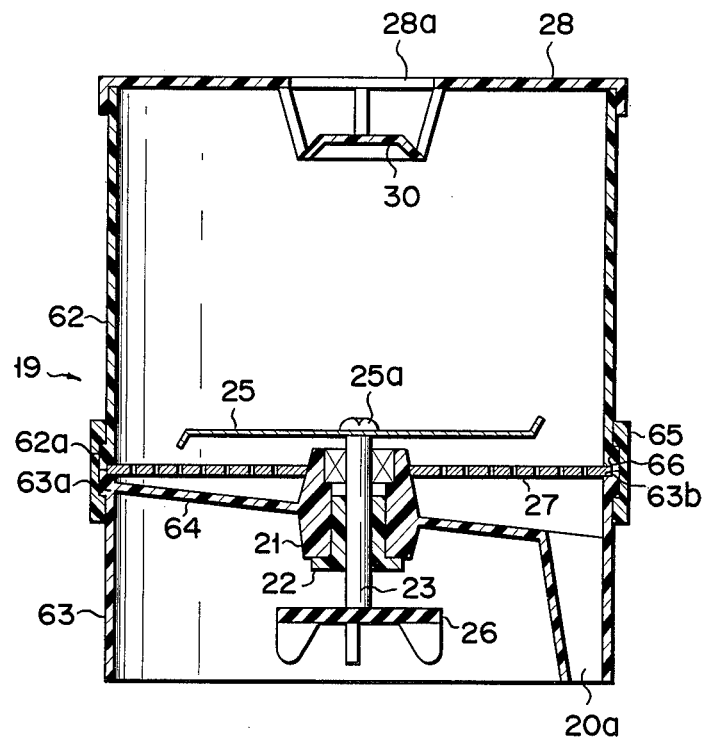
FIG. 12 is an enlarged vertical sectional view showing a case illustrated in FIG. 11.

A fifth embodiment of the coffee-pot and coffee-mill combination according to the invention will be described with reference to FIGS. 11 and 12.

In these figures, reference numeral 19 designates a case assembly comprising an upper half case 62 and a lower half case 63 which are substantially equal to each other in diameter. Ribs 62a and 63a are protruded from the lower end portion of the outer wall of the upper half case 62 and the upper end portion of the outer wall of the lower half case 63, respectively. A bottom wall 64 is formed integral with the lower half case 63. The bottom wall 64 is sloped downwardly, in one direction, towards the inner wall of the lower half case 63. An extracting outlet 20a is formed in the lowest portion of the bottom wall 64. Reference numeral 65 designates an annular packing used also as a handle. The annular packing 65 is made of an elastic material such as rubber and has an annular groove 66 in the inner wall thereof.

The case assembly 19 is assembled as follows: First, a filter 27 is placed on a shoulder 63b formed in the upper end portion of the inner wall of the lower half case 63. Then, the lower end of the upper half case 62 is placed on the upper end of the lower half case 63. Thereafter, the packing 65 is tightly placed over the upper half case 62 and the lower half case 63 by utilizing its elastic force in such a manner that the ribs 62a and 63a of the two cases 62 and 63 are engaged with, or inserted into, the annular groove 66. Thus, the two cases are watertightly connected together, and the filter 27 is clamped between the cases 62 and 63. Thereafter, a cutter 25 is mounted on the upper end portion of a cutter shaft 23 with a thumb screw 25a.

The remaining components are similar to those in the first embodiment.

The operation of the fifth embodiment of the combination thus constructed will be described. First, a predetermined quantity of water is supplied into the water storing tank 9, and a predetermined amount of coffee-beans is put in the case assembly 19. Then, the case assembly 19 is put in place in the case accommodating section 10, and the cup 41 is placed on the upper surface of the heater unit 32 in the cup accommodating section 7. As a result, the extracting outlet 20a of the case assembly 19 is confronted with the inside of the cup 41 through the communicating hole 31 formed in the upper wall of the cup accommodating section 7, and the coupling 26 of the driving shaft 23 is coupled to the coupling 16 of the motor 13. Thereafter, the contacts a and b of the change-over switch 44 is short-circuited to energize the motor 13 to rotate the cutter 25. As a result, the coffee-beans are ground by the rotating cutter 25 into coffee powder having a suitable grain size. Even if the case assembly 19 is caused to contact the frame 3 by vibration during the grinding operation, the vibration can be absorbed by the packing 65. Thereafter, the armature of the change-over switch 44 is tripped from the contact b over to the contact d, as a result of which the rotation of the motor 13 is stopped, and current is supplied to the sheathed heater 34. Accordingly, the water in the pipe 39 is heated and finally boiled, to develope a boiling pressure. Thus, the hot water is caused to flow upwardly along the hot water supplying pipe 39c by the boiling pressure, and it drips into the case assembly 19 through the receiving inlet 28a of the cover 28. The hot water thus dripped into the case assembly 19 is passed through the coffee powder to form a mixture of hot water and coffee powder. The mixture is filtered by the filter 27 to obtain a coffee liquid, which is allowed to drip into the cup 41 through the extracting outlet 20a. After the completion of coffee liquid extraction, the case assembly 19 is removed from the case accommodating section 10 to wash it with water. In this connection, in extracting the coffee liquid the case assembly 19 itself is heated to a considerably high temperature by the hot water; however, the temperature of the packing 65 is not raised to such a high value because of its heat insulation. Therefor, if the case assembly 19 is removed or displaced by holding the packing 65 with the hand, the user will never be burnt.

As is apparent from the above description, in the fifth embodiment of the combination, the case assembly 19 comprses the upper half case 62 and the lower half case 63, and the packing 65 is placed over the parts of the outer walls of the two cases. Therefore, the two cases are water-tightly connected together. In addition, although hot water is supplied into the case assembly 19, the temperature of the packing 65 is not raised to a high temperature. Accordingly, the packing 65 can be used as a handle, and it is unnecessary to provide a handle for the case assembly. Even if the user holds the packing 65 with the hand, he will never be burnt for the same reason.

In the above-described fifth embodiment, the two cases 62 and 63 are connected together by the use of the packing; however, the two cases may be connected together by tightening means such as screws.

Figure 13:
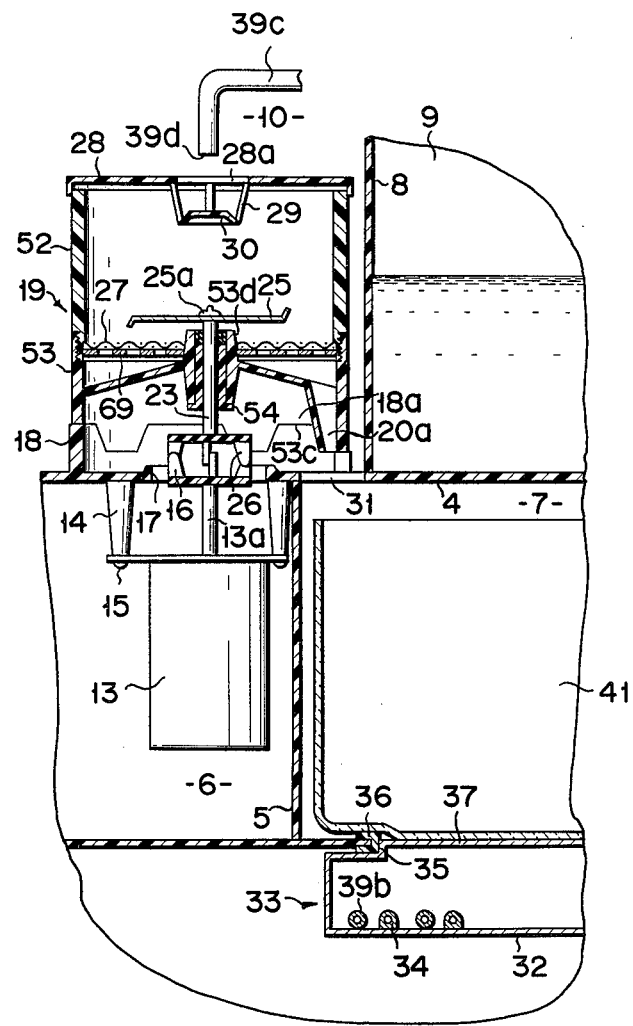
FIG. 13 is an enlarged vertical sectional view showing a sixth embodiment of the combination according to the invention.
Figure 14:
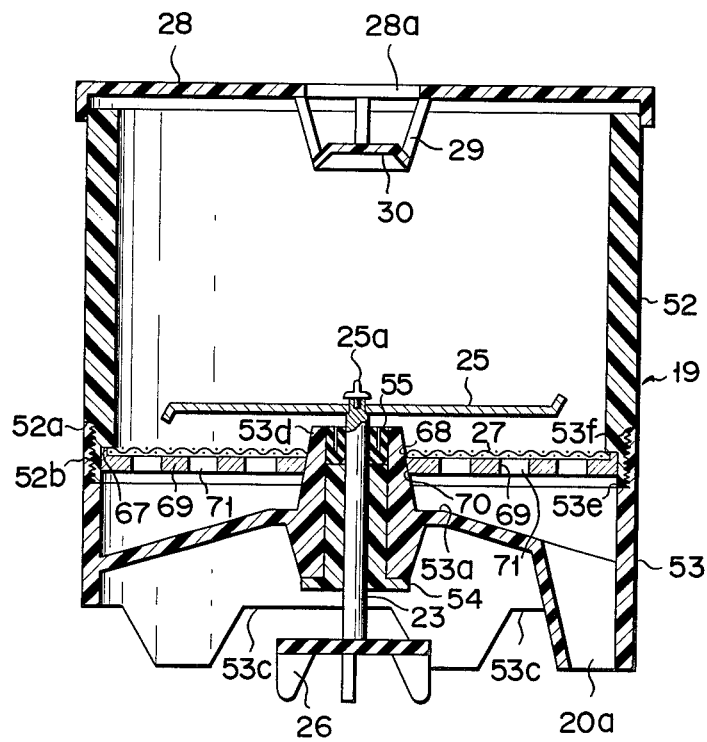
FIG. 14 is an enlarged vertical sectional view showing a case illustrated in FIG. 13.

A sixth embodiment of the coffee-pot and coffee-mill combination according to the invention will be described with reference to FIGS. 13 and 14.

In these figures, reference numeral 27 designates an elongated filter made of metal such as for instance stainless steel. The filter 27 is disposed below a cutter 25 in the lower part of an upper half case 52. The filter 27 is in the form of a circle whose diameter is slightly smaller than that of a step or shoulder section 67 of the upper half case, which is larger in inside diameter than the other portions of the upper half case. The filter 27 has an opening at the central portion, whose diameter is equal to the outside diameter of the upper portion of the aforementioned shaft cylinder 53d. The filter 27 is, of course, adapted to receive the coffee powder obtained by grinding coffee beans with the cutter, thereon. Reference numeral 69 designates a reinforcing member made of synthetic resin, which are arranged beneath the filter 27 in the lower part of the upper half case 52. The reinforcing member 69 is circular, having a diameter substantially equal to the outside diameter of the step section 67. The reinforcing member 69 has an opening in the central portion thereof, whose diameter is equal to the outside diameter of the upper portion of the shaft cylinder 53d, and has a number of through-holes 71 distributed over itself. The case 19 is assembled as follows: First, the filter 27 is inserted into the upper half case 52 from below in such a manner that the peripheral portion of the filter is abutted against the step section 67. Then, the reinforcing member 69 is inserted into the upper half case 52 from below so that the filter 27 is clamped by the step section 67 and the reinforcing member 69. Thereafter, the periphery of the reinforcing member 69 is welded to the inner wall of the upper half case 52 by ultrasonic welding, thereby to secure the filter 27 to the upper half case 52. Then, a lower half case 53 is connected to the upper half case 52 by engaging the threaded section 53f of the former with the threaded section 52b of the latter. As a result, the opening 68 of the filter 27 and the opening 70 of the reinforcing member 69 can be placed over the shaft cylinder 53d. Thereafter, the cutter 25 is mounted on a driving shaft 23 with a thumb screw 25a.

As is clear from the above description, in the sixth embodiment of the combination according to the invention, the reinforcing member 69 is provided beneath the filter 27, the peripheral portion of the filter 27 is clamped by the step section 67 of the upper half case 52 and the reinforcing member 69, and the reinforcing member 69 is welded to the upper half case 52 by ultrasonic welding, thereby to fixedly secure the filter 27 to the upper half case 52. Assume that such a reinforcing member 69 is not provided in the case 19. In this case, the filter 29 will be deformed, or bent, or creased, by the weight of coffee-beans when supplied in the case 19, or by the grinding pressure when the grinding operation is effected. As a result, the distance between the cutter 25 and the filter is deviated from a value required to suitably grinding the coffee-beans, and accordingly the coffee-beans cannot be effectively ground. In addition to this difficulty, another difficulty may be arisen that the filter 27 made of stainless steel cannot be welded to the upper half case 52 by the ultrasonic welding which is the most simple welding method of welding two members of synthetic resin.

However, in the sixth embodiment according to the invention, the reinforcing member 69 is provided beneath the filter 27 to reinforce the latter 27, and therefore the filter 27 is never deformed, or bent, or creased. Accordingly, the distance between the cutter 25 and the filter 27 is maintained unchanged as predetermined, whereby the coffee-beans can be effectively ground. Furthermore, the filter 27 is fixedly secured to the upper half case 52 by welding the reinforcing member 69 to the upper half case 52 by ultrasonic welding, which facilitates the assembling of the case. In addition, according to the sixth embodiment of the combination, the peripheral portion of the filter 27 is tightly clamped by the step section 67 and the reinforcing member 69, and therefore the net of the filter 27 is never frayed in the peripheral portion thereof.

Now, seventh, eighth and ninth embodiments of the coffee-pot and coffee-mill combination according to the invention will be described with reference to FIGS. 15 through 18.

Figure 15:
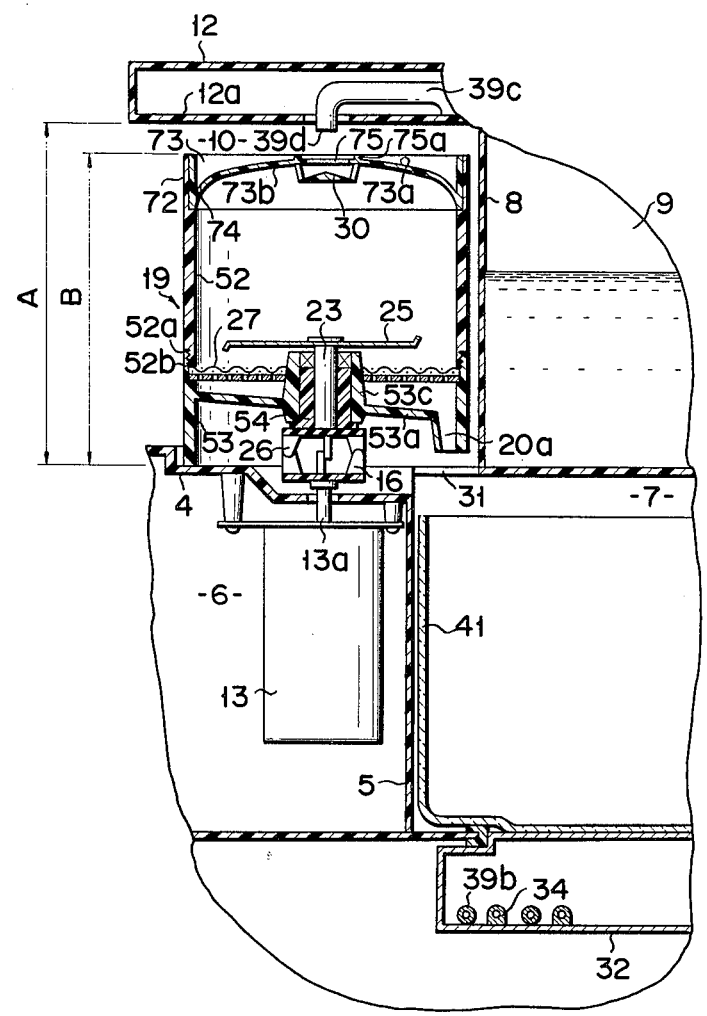
FIG. 15 is an enlarged vertical sectional view showing parts of the essential components of a seventh embodiment of the combination according to the invention.
Figure 16:
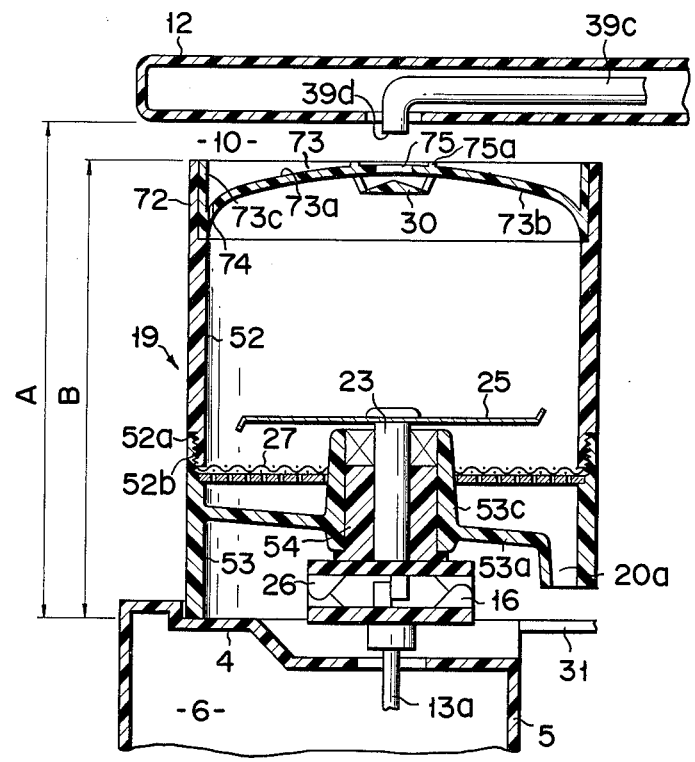
FIG. 16 is an enlarged vertical sectional view showing some of the essential components shown in FIG. 15.

Referring to FIGS. 15 and 16, reference numberal 19 designates a case assembly which is detachably mounted on a horizontal partition plate 4 of a case accommodating section 10. The case assembly 19 is in the form of a bottomed cylinder, and comprises an upper half case 52 and a lower half case 53. An extended wall section 72 is formed along the entire edge of the upper opening of the upper half case. As shown in FIG. 16, a dimension A is somewhat longer than the height B of the case assembly 19. Reference charactor 52a designates a bottom wall which is inclined from the left-hand side to the right-hand side as viewed in FIG. 16. The bottom wall 53a has an extracting outlet 20a at the lowest end thereof, and has a shaft cylinder 70 integrally formed therewith at the central portion thereof. Reference character 73 is intended to designate a cover which is detachably inserted into the upper opening of the upper half case 52. The cover 73 is so designed as to be fitted into the extended wall section 72. The cover 73 has a curved section 73a which, as it goes from the center to the periphery, is gradually curved downwardly. Formed in the lowest portion of the curved section 73a is a through hole 74 communicating with the inside of the case assembly 19. Furthermore, in the cover 73, a substantially spherical guide surface 73b is provided which, as it goes from the center to the periphery, is also gradually curved and diverged. Reference numeral 75 designates a receiving inlet for supplying hot water, which is formed in the central portion of the cover 73. A rib 75a is formed around the receiving inlet 75, and a diffusing plate 30 is provided right below the receiving inlet 75 in such a manner that the diffusing plate 30 confronts the receiving inlet 75. When the cover 73 is inserted into the upper opening of the upper half case 52, the periphery of the cover 73 is tightly surrounded by the extended wall section 72, while the upper end of the cover 73 is flush with the upper end of the extended wall section 72, as shown in FIG. 16.

When the case assembly 19 with the cover 73 is placed on the horizontal partition plate 4, the hot water supplying outlet 39d of a hot water supplying pipe 39c confronts the diffusing plate 30 through the receiving inlet 75 as shown in FIG. 16, and a peaked section 12a covers the case assembly 19 completely. Furthermore, in this case, the distance between the peaked section 12a and the upper end of the case assembly 19 is so short that no finger is inserted therebetween. At the same time, couplings 16 and 26 are coupled to each other, and an extracting outlet 20a is confronted through a communicating hole 31 with the inside of a cup 41 accommodated in a cup accommodating section 10.

The remaining components are similar to those shown in the first embodiment.

The operation of the combination thus constructed will be described. First, a predetermined amount of water is poured into the water storing tank 9, and a predetermined amount of coffee-beans are put in the case assembly 19. Thereafter, the case assembly 19 is covered with the cover 73. Then, the case assembly 19 is placed on the horizontal partition plate 4. Current is applied to the motor 13 by operating an operating knob (not shown) to energize the motor 13. As a result, the cutter 25 is rotated through the couplings 16 and 26, whereby the coffee-beans are ground to a suitable grain size.

In this case, the coffee-beans, being beaten by the rotating cutter 25, are ground, and the coffee-beans thus hit repeatedly are splashed upwardly. However, as the inner surface of the cover 73 is formed as the guide surface 73b which is substantially spherical, the coffee-beans thus splashed are guided towards the center of the cutter 25 by means of the guide surface 73b, and finally caused to drop substantially onto the center of the cutter 25. As this control operation is repeated, the coffee-beans are grounded into coffee powder having a suitable grain size.

Thereafter, the aforementioned operating knob is operated to stop the rotation of the motor 13 on the one hand and to apply current to the sheathed heater 34 on the other hand. As a result, the heater 34 generates heat to heat and boil the water in the heating pipe 39b. The hot water thus obtained is caused to rise along the hot water supplying pipe 39c by the boiling pressure, and it is finally allowed to drip into the case assembly 19 through the hot water supplying outlet 39d, the receiving inlet 75 of the cover 73, and the diffusing plate 30. The hot water thus dripped is passed through the coffee powder to form a mixture of hot water and coffee powder, which is filtered by the filter 27 to obtain a coffee liquid. The coffee liquid thus obtained is allowed to drip into the cup 41 through the extracting outlet 20a and the communicating hole 31.

The hot water, when dripped from the hot water supplying outlet 39d, may be partly splashed by the diffusing plate 30 over the upper surface of the cover 73 through the receiving inlet 75. However, the hot water thus splashed is caught by the annular wall 73c of the cover 73 or by the extended wall section 72 of the case assembly 19. Accordingly, the hot water flows down along the curved section 73a and finally flows into the case assembly 19 through the through hole 74 formed in the cover.

In this embodiment of the combination according to the invention, when the case assembly 19 is placed in the case accommodating section, the case assembly 19 is covered by the peaked section 12a in such a manner that the air gap between the case assembly 19 and the peaked section 12a is very small. Therefore, it is impossible for the user to insert his finger into the air gap. In this connection, the height B of the case assembly 19 is unchanged whether or not the cover 73 is inserted into the upper portion of the case assembly 19 as is apparent from FIG. 16. Accordingly, even if the user places the case assembly 19 without the cover 73 in the case accommodating section 10, the air gap between the case assembly 19 and the peaked section 12a is always small (because of the presence of the peaked section 12a). Therefore, in this case also where the case assembly is not covered with the cover 73 and is placed in the case accommodating section 10, the user cannot insert his finger into the air gap because it is still narrow as described above. Thus, the safety in handling the combination according to the invention is considerably improved when compared with the conventional one involving a hazard that the user's finger might be injured when erroneously inserted into the case 19 during the coffee-bean grinding operation, that is, the rotation of the cutter 25.

In addition, in the above-described embodiment of the combination, the extended wall section 72 is formed along the periphery of the upper opening of the case assembly 19. Therefore, the height of the case assembly 19 is increased as much as the height of the extended wall section 72. Accordingly, in the case where coffee-beans are ground to an excessively fine grain size by operating the cutter for a period of time longer than the predetermined period of time, as a result of which the efficiency of filtering the hot water is considerably lowered and accordingly the hot water flows over the upper opening of the case assembly 19, it is possible to delay the overflow of hot water as long as a period of time corresponding to the height of the extended wall section 72. In this connection, however finely the coffee-beans have been ground, the hot water can spread itself into the coffee powder. Therefore, if the quantity of water (serving for five or six persons) predetermined for this combination is used, the overflow of hot water can be sufficiently prevented with the height of the extended wall section 72.

Furthermore, the inner surface of the cover of the case assembly 19 is formed as the guide surface 73b which is substantially spherical, as was described before. Therefore, the coffee-beans splashed upwardly by being beaten by cutter 25 are guided by the guide surface 73b to drop towards the substantially central portion of the cutter 25, as a result of which the coffee-beans are moved regularly to be uniformly ground. Thus, the coffee-beans can be effectively ground into coffee-powder. Moreover, as the coffee-beans are moved regularly by being guided by the guide surface 73b, the generation of noise may be minimized.

Figure 17:
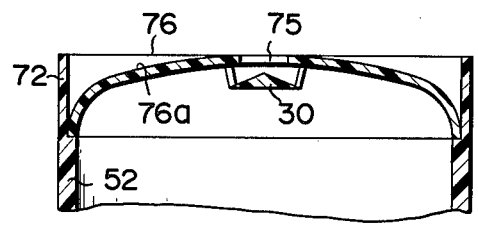
FIG. 17 and FIG. 18 are enlarged sectional views showing covers employed in eighth and ninth embodiments of the combination according to the invention, respectively.
Figure 18:
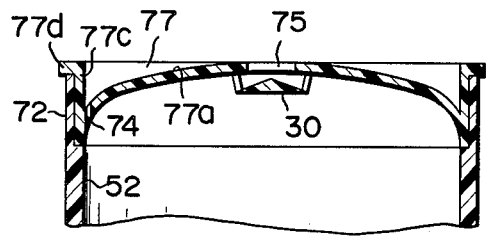

In the above-described embodiment of the combination, the rib 75a is provided around the receiving inlet 75 of the cover 73; however, the provision of the rib 75a is not always necessary. The configuration of the cover 73 may be modified as shown in FIGS. 17 and 18 which illustrate the eighth embodiment, and the ninth embodiment, of the combination according to the invention. More specifically, in the eighth embodiment, its cover 76 has no extended wall section 73b (shown in FIG. 16) around the receiving inlet 75; and in the ninth embodiment, the extended wall section 73b of its cover 77 has another rib 77d.

In the above-described seventh, eighth and ninth embodiments, the inner surface of the cover 73 (76 and 77) is formed as the substantially spherical guide surface 73b; however, the inner surface may be formed as a conical guide surface for instance. That is, all that is necessary is to form a guide surface which, as it goes from the center to the periphery, deverges downwardly.

Figure 19:
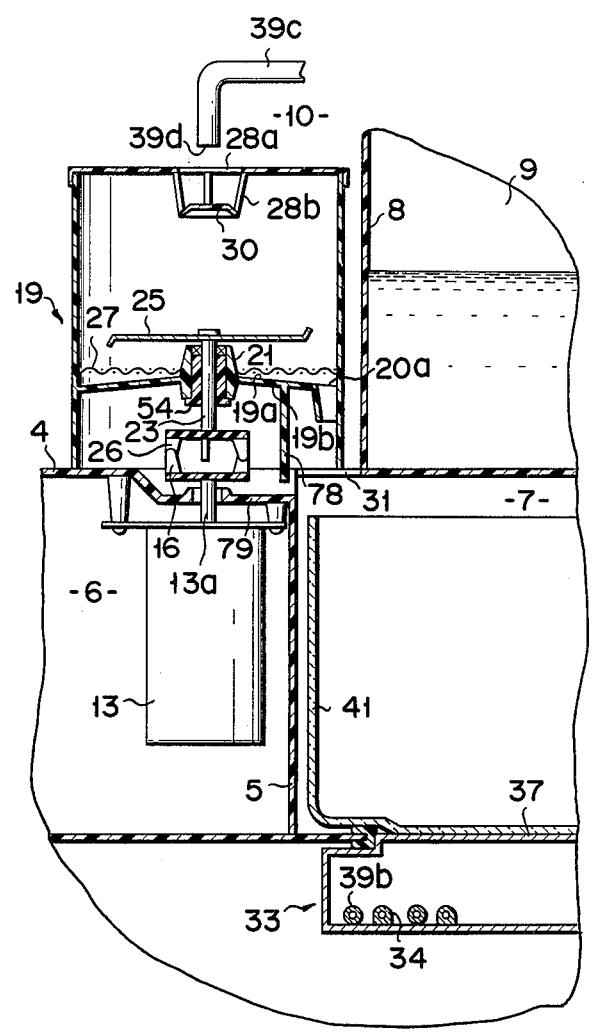
FIG. 19 is an enlarged vertical sectional view showing the essential components of a tenth embodiment of the combination according to the invention.

A tenth embodiment of the coffee-pot and coffee-mill combination according to the invention will be described with reference to FIGS. 19, 20 and 21.

In these figures, reference numeral 78 designates a plate-shaped protrusion formed on the outer bottom surface 19b of a case 19. The protrusion 78 is closer to the central axis of the case than an extracting outlet 20a thereof. More specifically, the protrusion 78 is extended downwardly substantially perpendicularly to the outer bottom surface 19b and integrally with the case 19, so that it is protruded downwardly from the lower end 19c of the case.

The operation of the tenth embodiment of the combination thus constructed will be described.

First, a predetermined quantity of water is poured into a water storing tank 9, and a predetermined amount of coffee-beans are put in the case 19. Then, the case 19 is mounted in place on a horizontal partition plate 4 of a case accommodating section 10. In this case, the mounting of the case 19 will never be obstructed by the protrusion 78, because the latter 78 is accommodated in a recess 79 formed in the horizontal partition plate 4. Accordingly, the case 19 can be mounted substantially perpendicularly to the horizontal partition plate 4. A coupling 26 is coupled to a coupling 16, while the extracting outlet 20a is confronted with a cup 41 placed in a cup accommodating section 7, through a communicating hole formed in the horizontal partition plate 4 to communicate the case accommodating section 10 with the cup accommodating section 7. Thereafter, an operating knob (not shown) is operate to energize an electric motor 13 thereby to rotate a cutter 25 through the couplings 16 and 26. As a result, the coffee-beans are gound to a suitable grain size. Thereafter, the operating knob is further operated to stop the rotation of the motor 13 on one hand and to apply current to a sheathed heater 34 on the other hand. Thereafter, the sheathed heater 34 generates heat, which heats and boils the water in a heating pipe 39b. The hot water is pushed upwardly along a hot water supplying pipe 39c by the boiling pressure, and is finally allowed to drip into the case 19 from the hot water supplying outlet 39d of the hot water supplying pipe 39c through the receiving inlet 28a on the cover 28 and the diffusing plate 30. The hot water thus dripped into the case 27 spreads into the coffee powder to form a mixture of hot water and coffee powder, which is filtered by the filter 27 into a coffee liquid. The coffee liquid thus obtained is allowed to drip into the cup 41 through the extracting outlet 20a and the communicating hole 31.

Figure 20:
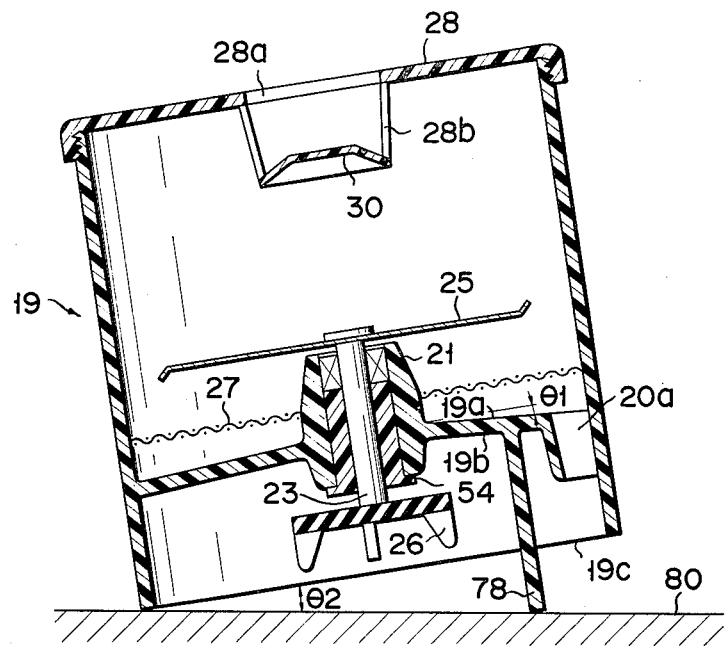
FIG. 20 is an enlarged vertical sectional view showing a case shown in FIG. 19, which is placed on a horizontal surface such as that of a table.

When, in order to clear away the coffee-dregs left in the case 19 after extraction of the coffee liquid, the case 19 is removed from the case accommodating section 10 and is temporarily placed on a horizontal surface 80 such as that of a table, the lower left end of the peripheral edge of the case 19 and the protrusion 78 are brought into contact with the horizontal surface 80; that is, the case is inclined through an angle $\theta_2$ to the left-hand side, as shown in FIG. 20. In this connection, it should be noted that the inclination angle $\theta_2$ is larger by a predetermined value than the inclination angle $\theta_1$ of the inner bottom surface 19a of the case 19.

As is apparent from the above description, in the tenth embodiment, the protrusion 31 is extended from the outer bottom surface 19b of the case 19. Accordingly, when the case 19 is temporarily placed on the horizontal surface 80 such as that of a table to remove the coffee-dregs left in the case 19 after extraction of the coffee liquid, the position of the extracting outlet 20a is higher than any portions of the inner bottom surface 19a of the case 19 because the inclination angle $\theta_2$ is larger than the inclination angle $\theta_1$. Accordingly, in this case, a very small amount of coffee liquid remaining in the case 19 is allowed to flow left along the inner bottom surface 19a and is finally pooled in the left-hand part of the case, which is opposite to the extracting outlet 20a. Thus, the flow of the coffee liquid through the extracting outlet 20a can be positively prevented, which protects a horizontal surface 80 such as that of a table from being made dirty by the coffee liquid.

Figure 21:
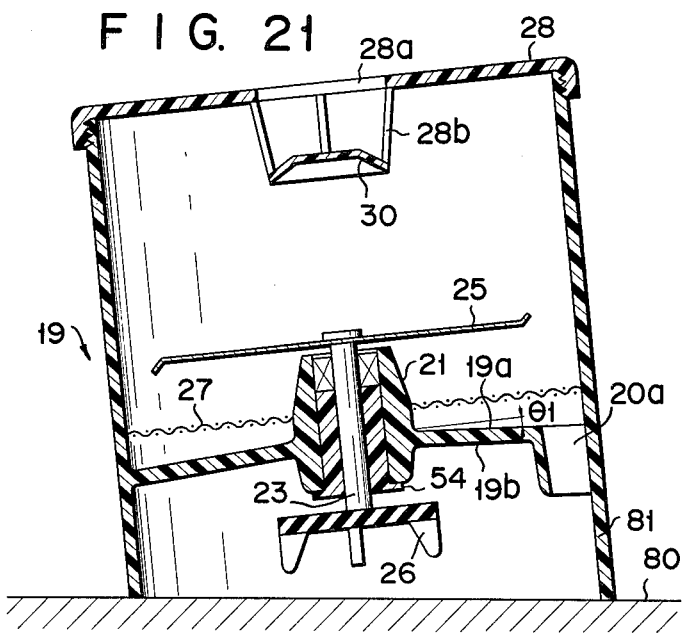
FIG. 21 is an enlarged vertical sectional view showing a modification of the case shown in FIG. 20.

The same effect can be obtained by modifying the case 19 as shown in FIG. 21. More specifically, the lower end section of the case 19 is extending substantially in its entirety as it approaches the extracting outlet 20a, thereby to form an extrusion 81, so that the lower end of the case 19 forms an inclined surface.

As is clear from the above description in the coffee-pot and coffee-mill combination according to the invention, the body is provided which accommodates the motor and the cup adjacent to the motor and has the water storing tank above the cup, the case having the grinder adapted to grind coffee-beans and the filter receiving the coffee powder thereon is arranged to be above the motor, and the hot water supplying device having the heating section for heating the water in the water storing tank and supplying the hot water into the case after the coffee-beans have been ground is provided in the body. Accordingly, all the process from grinding coffee-beans to extracting a coffee liquid can be achieved by only one coffee-pot and coffee-mill combination. Yet the combination can be readily operated and cleaned. It is possible to obtain a coffee liquid without losing the scent of coffee beans. As the case is placed above the motor, the rotation of the motor can be effectively transmitted to the grinder in the case, the provision of a pulley transmission mechanism is unnecessary, and the size of the coffee-pot and coffee-mill combination can be reduced as much.

Futhermore, the coffee-pot and coffee-mill combination can be proposed by this invention, in which coffee-beans can be effective and smoothly ground by the grinder, and hot water is thereafter positively supplied to the coffee powder collected along the inner wall of the case, thereby to effectively extract a coffee liquid.

In addition, the coffee-pot and coffee-mill combination can be proposed according to the invention, in which the extracting outlet of the case is closed by the valve means after the coffee-liquid has been extracted, whereby the dripping of the coffee-liquid left in the case can be positively prevented and accordingly floors or clothes or the combination itself is never made dirty by the coffee-liquid.

According to another aspect of the invention, proposed is the coffee-pot and coffee-mill combination in which the case is made up of the upper half case and the lower half case to clamp the filter therebetween, so that the filter may not be removed from the case during the operation of the combination, the case be detachably mounted on the body of the combination, and the cleaning of the case and of the filter can be readily achieved because the case can be divided into the two parts, the upper half case and the lower half case.

Moreover, the coffee-pot and coffee-mill combination according to the invention has a specific feature that, as the case comprises the upper half case and the lower half case and the packing used also as the handle is placed over the connection portions of the upper half case and the lower half case, the two cases can be water-tightly connected together and the user is never burnt by the hot water which is supplied into the case.

In another coffee-pot and coffee-mill combination according to the invention, the filter is prevented from being bent or creased or deformed thereby to effectively achieve the grinding of coffee-beans.

Another coffee-pot and coffee-mill combination according to the invention has a varity of merits that, even if the case without its cover is placed on the body of the combination, the user cannot insert his finger into the case because of the provision of the peaked partion and the extended wall section extended from the case, that is, the user's finger is protected from being injured by the rotating grinder, which leads to an improvement of the safety; the hot water splashed upwardly can be caught by the peaked section; and when hot water is supplied into the hot water supplying inlet formed in the substantially central portion of the case, the hot water is guided by the guide surface, which is formed in the inner surface of the upper portion of the case, so that the hot water is positively supplied onto the coffee powder collected along the inner surface of the case, thereby to effectively extract the coffee liquid.

In the last embodiment of the coffee-pot and coffee-mill combination according to the invention, the extracting outlet is higher than the lowest point of the inner bottom surface of the case when the case is placed on a horizontal surface such as that of a table, whereby the flow of the coffee liquid left in the case can be positively prevented, and accordingly the horizontal surface such as that of a table will never be made dirty by the coffee liquid remaining in the case.

What we claim is:

1. A coffee-pot and coffee-mill combination which comprises:
   (a) an electric motor,
   (b) a case having a peripheral surface,
   (c) a body having a cup accommodating section for accommodating a cup, a motor accommodating section provided adjacent to said cup accommodating section for accommodating said electric motor, a water storing tank provided above said cup accommodating section, and a case accommodating section provided adjacent to said water storing tank and above said motor accommodating section, for accommodating said case, said case being provided with a grinder coupled to said motor to grind coffee-beans into coffee powder and a filter for receiving said coffee powder, and
   (d) a hot water supplying device provided in said body and having a heating section for heating the water from said water storing tank, said water storing means including means for supplying hot water into said case.

2. A combination as claimed in claim 1, which is so arranged that, when said cup is accommodated in said cup accommodating section, the cup thus accommodated and said case placed in said body are partly overlapped one on another as viewed from above, and said case has an extracting outlet which is confronted with the inside of said cup through the overlapped portion thereof.

3. A combination as claimed in claim 2, in which said case further comprises a valve means for selectively opening and closing said extracting outlet.

4. A combination as claimed in claim 2, in which said case is provided with a protrusion by which, when said case is removed and placed on a horizontal surface, the level of said extracting outlet is made to be higher than that of the lowest point of an inner bottom surface of said case.

5. A combination as claimed in claim 1, in which said case has a cover member which is placed over the upper opening thereof, said cover member having a hot water pouring inlet, and a diffusing element which is connected to said cover in such a manner that said diffusing element confronts said hot water pouring inlet from below, said diffusing element having a guide section which is sloped downwardly from the center thereof to the periphery thereof, so that hot water is supplied by said hot water supplying device into said case through said hot water pouring inlet after the coffee-beans have been ground.

6. A combination as claimed in claim 1, in which said case is made up of an upper half case and a lower half case, and the peripheral portion of said filter is clamped between said upper half case and lower half case.

7. A combination as claimed in claim 6, further comprising a packing means, placed over the connection portions of said upper half case and said lower half case for preventing leakage between said upper half case and said lower half case, said packing means extending outwardly from said peripheral surface of said case so as to serve as a handle for holding said combination.

8. A combination as claimed in claim 6, in which said filter has packing means, along the peripheries thereof, respectively, for water-tightly connecting said upper half case to said lower half case.

9. A combination as claimed in claim 1, in which said case further comprises a reinforcing member which is disposed beneath said filter for reinforcing said filter.

10. A combination as claimed in claim 9, in which said reinforcing member has a number of protrusions which are in contact with the lower surface of said filter.

11. A combination as claimed in claim 1, in which said body is provided with a peaked section in such a manner that said peaked section covers said case which is detachably placed in said case accommodating section, and said case is provided with a cover which is detachably inserted into the upper opening of said case, said cover having a receiving inlet, and an extended wall section formed along the edge of the upper opening of said case so as to surround the outer periphery of said cover.

12. A combination as claimed in claim 11, in which said cover has a through hole through which the outside of said case is communicated with the inside of said case.

13. A combination as claimed in claim 11, in which said cover has an inner surface which is substantially spherical.

* * * * *